Jan. 4, 1966
R. J. MINDER ETAL
3,227,320
SANDWICH FILLER MECHANISM
Filed Sept. 7, 1962
2 Sheets-Sheet 1
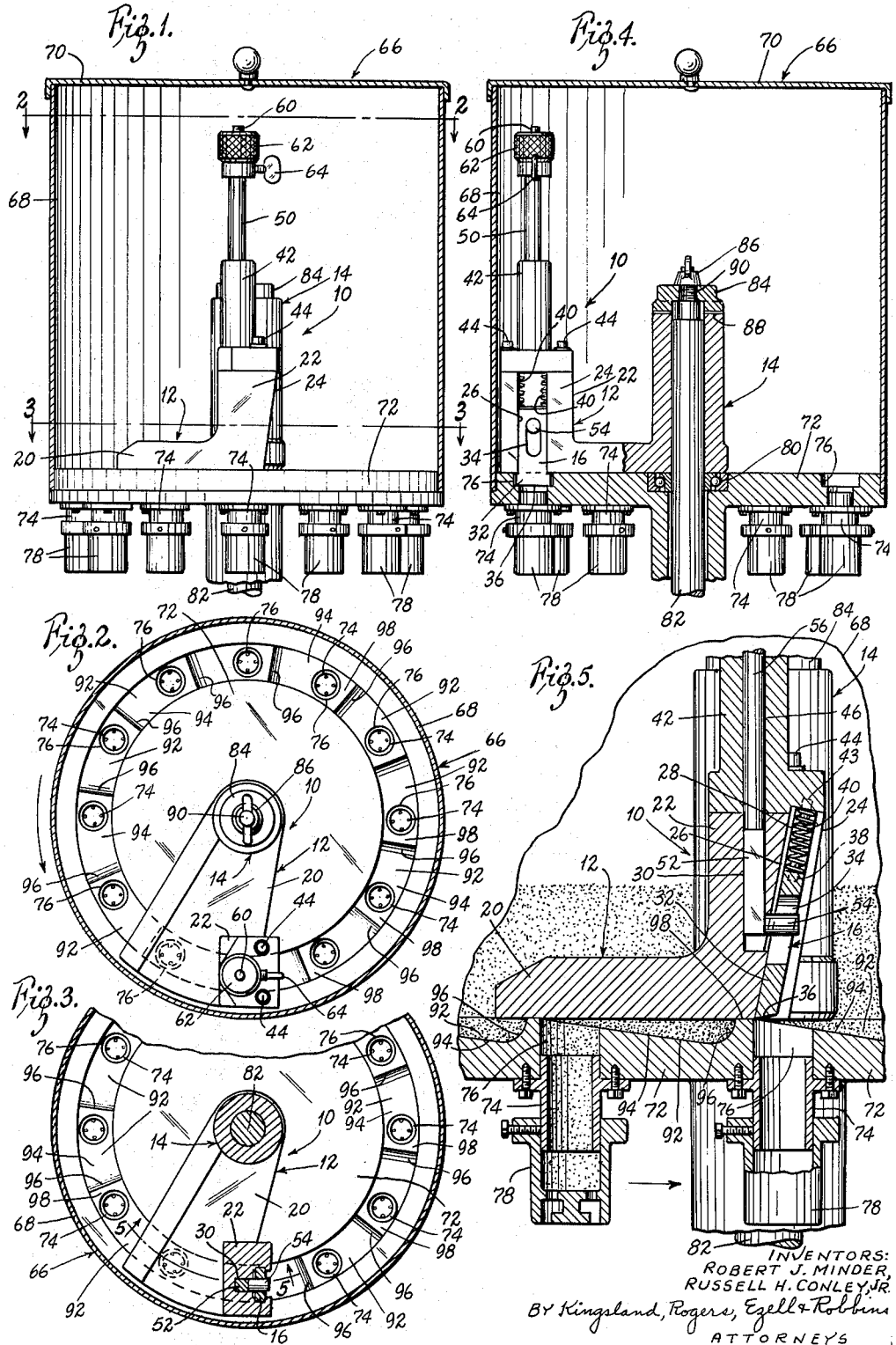
INVENTORS:
ROBERT J. MINDER,
RUSSELL H. CONLEY, JR.
BY Kingsland, Rogers, Ezell & Robbins
ATTORNEYS

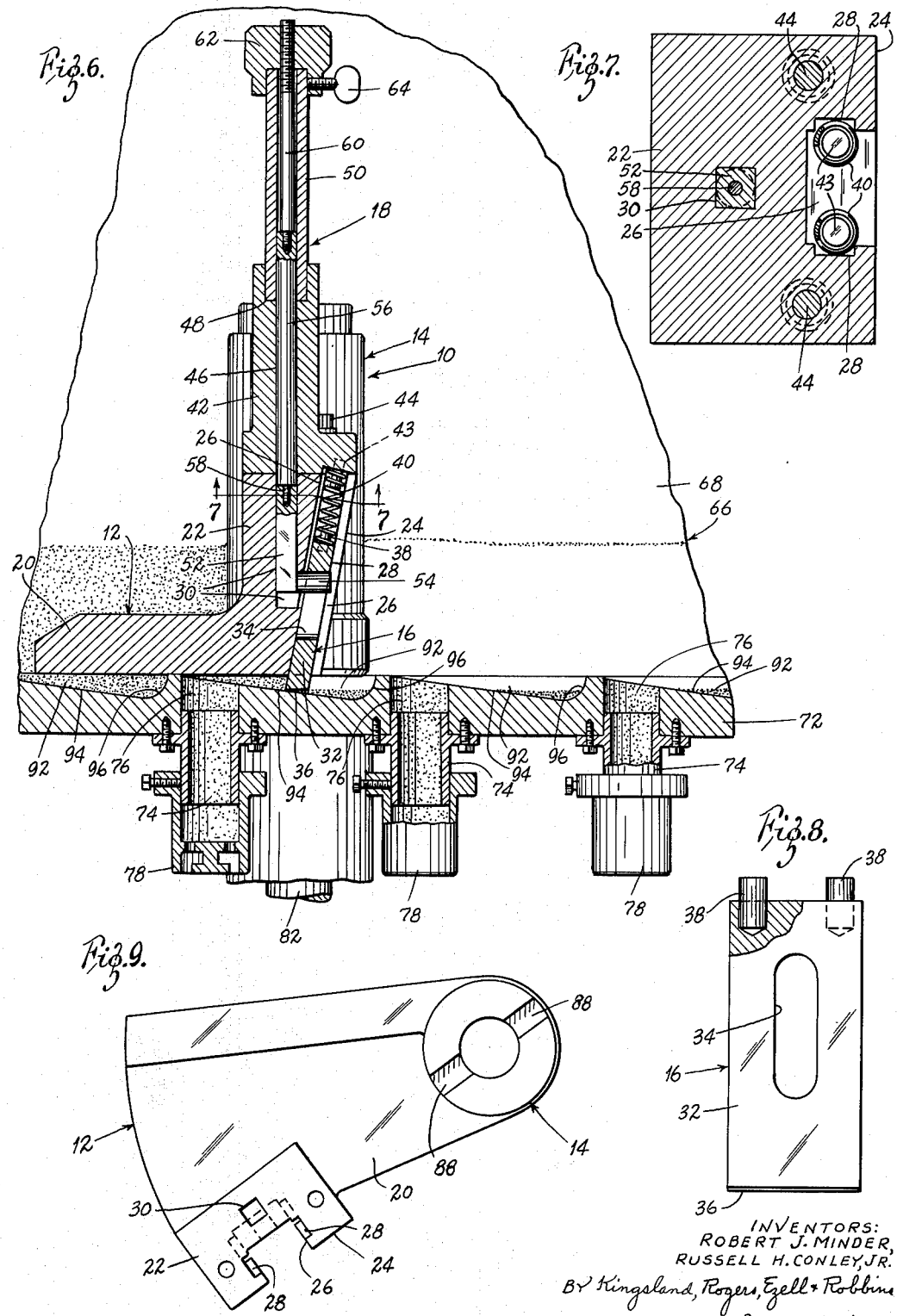

United States Patent Office 3,227,320
Patented Jan. 4, 1966

3,227,320
SANDWICH FILLER MECHANISM
Robert J. Minder, Athens, and Russell H. Conley, Jr., High Shoals, Ga.; said Conley assignor to said Minder
Filed Sept. 7, 1962, Ser. No. 222,026
7 Claims. (Cl. 222—168.5)

The present invention relates generally to automatic machinery for making sandwiches, such as cracker or like sandwiches, which include peanut butter, confectionery filling, and other substances, and more particularly to the filler material holding and discharging mechanism for such automatic machinery. The structure of the present application is an improvement on the structure of United States Patent No. 2,941,698, granted June 21, 1960, to Frank Edward Fowler and the first applicant.

As in the mechanism disclosed and claimed in said United States patent, the present novel filler material holding and discharge mechanism includes a rotatably mounted casing within which are disposed elements of a filler material discharge device mounted in fixed relation thereto. The base of the casing comprises a heavy annular plate in which filler material discharge sleeves are mounted in depending relation, each sleeve being fed filler material from a novel trough segment formed in the upper surface of said plate. The discharge device includes improved means cooperating with the plate and trough segments for forcing charges of filler material into the sleeves in continuous succession in a manner substantially eliminating leak-back beneath a spring-loaded blade. An adjustment is provided for the blade which can be manipulated while the machine is in operation.

Therefore, an object of the present invention is to provide a novel improved discharge mechanism for cracker-sandwich machinery which will more efficiently deposit filler material on successive crackers in predetermined amounts at a wide range of speeds than existing constructions.

Another object is to provide a novel discharge mechanism of the kind herein disclosed which is constructed to substantially eliminate leak-back of filler material.

Another object is to provide a novel filler discharge mechanism for cracker-sandwich making machinery which can be adjusted while the machine is in operation, thereby eliminating this facet of down time.

Another object is to provide a novel filler material discharge mechanism for cracker-sandwich making machinery in which the filler material blade is disposed at an angle in respect to a trough or groove to reduce to a minimum the wear on the parts during operation.

Another object is to provide a novel filler material discharge mechanism for cracker-sandwich making machinery which is highly efficient in use, which substantially eliminates vibration, and which overcomes other deficiencies found in existing equipment.

Another object is to provide a novel improved filler material discharge mechanism which is fully automatic in depositing successive predetermined amounts of filler material on the crackers, and the like.

The foregoing and other objects and advantages are apparent from the following description taken with the accompanying drawings, in which:

FIGURE 1 is a side elevational view of a filler material discharge mechanism constructed in accordance with the teachings of the present invention, viewed on a radius towards the center of the filler material receiving container, the casing and lid of the container being in transverse, vertical cross section;

FIGURE 2 is a horizontal cross-sectional view taken on substantially the line 2—2 of FIGURE 1;

FIGURE 3 is a horizontal cross-sectional view taken on substantially the line 3—3 of FIGURE 1;

FIGURE 4 is a view taken at ninety degrees to FIGURE 1, showing the novel filler material discharge mechanism in front elevation and the filler material container and integral mounting sleeve of the filler material discharge mechanism in vertical transverse cross section for illustration of details;

FIGURE 5 is an enlarged, vertical cross-sectional view taken substantially on the arcuate line 5—5 of FIGURE 3;

FIGURE 6 is a vertical cross-sectional view similar to FIGURE 5, illustrating filler material discharge elements in a different position in relation to the discharge sleeves and trough segments;

FIGURE 7 is a further enlarged horizontal cross-sectional view taken on substantially the line 7—7 of FIGURE 6;

FIGURE 8 is an enlarged plan view of the blade, a portion being in cross section for illustration of details; and FIGURE 9 is a top plan view of the improved integral cast dasher of the present novel filler material discharge mechanism.

Referring to the drawings more particularly by reference numerals, 10 indicates generally a filler material discharge mechanism constructed in accordance with the teachings of the present invention. The filler material discharge mechanism 10 includes a dasher 12, an integral sleeve 14, a filler measuring and feeding blade 16, and an adjustment device 18 for positioning the blade 16.

The dasher 12 includes a wedge-shaped plate 20. At the narrow end of the plate 20, the integral sleeve 14 extends vertically upwardly, as is clear from FIGURES 4 and 9. At one corner of the arcuate wide portion of the plate 20 is an integral housing block 22 which extends vertically upwardly therefrom and is of a cross section clearly shown in the drawings. The front face 24 of the block 22 slopes rearwardly from top to bottom, this slope being continued to the bottom of the plate 20, as is clear from FIGURES 1, 6 and 7. A groove 26 including opposed channels 28 is formed in the front face 24 and follows the slope thereof. Extending into the block 22 is a well 30 which communicates at the bottom with the groove 26 (FIGS. 5 and 6).

A blade 32 having an elongated centrally disposed slot 34 is disposed in the channels 28. The material gauging end 36 of the blade 32 is cut at an angle so that it is substantially horizontal when the plate 32 is disposed in the channels 28. Pins 38 are mounted in the opposite end of the blade 32, each of which receives one end of a compression spring 40 preferably of about six pounds load capacity.

The adjustment device 18 includes a block member 42 which is mounted on the housing block 22 and is secured thereto by suitable machine screws 44. The block member 42 serves as the upper stop for the springs 40, downwardly extending pins 43 serving as guides therefor. The block member 42 has an opening 46 therethrough which communicates with the well 30. The cross section of the well 30 is illustrated as square while the cross section of the opening 46 is round. Mounted on top of the block member 42 in a well 48 is a tube 50. The tube 50 may be press-fitted, as shown, or otherwise secured in position, as by threads. Within the well 30 is a shaft segment 52 of square cross section having a pin 54 of round cross section secured to the lower end thereof and extending horizontally therefrom into the groove 26 and through the slot 34 of the blade 32 for lifting of the blade 32, as is clear from the drawings. A second shaft segment 56 of round cross section is connected to the upper end of the shaft segment 52 by means of a threaded reduced portion 58. A third shaft segment 60 threaded at the upper end is similarly secured to the upper end of the second shaft segment 56, the shaft segment 60 being disposed within the tube 50. An adjustment knob 62 threadedly engages the upper end of the shaft segment 60 and is disposed about the upper end of the tube 50. A thumb screw 64 extends through the adjustment knob 62 and engages the upper end of the tube 50 for maintaining the parts in selected position of adjustment. It is clear from the foregoing that upon loosening the thumb screw 64, the adjustment knob 62 may be rotated clockwise or counterclockwise to change the position of the pin 54 in relation to the blade 32. In FIGURE 6, the pin 54 is in its upper position of movement. It may be moved to a position with the lower end of the shaft segment 52 engaging the bottom of the well 30.

The filler material discharge mechanism 10 is operatively mounted within a filler material container generally designated 66 which includes a cylindrical casing 68, a removable top 70 and a heavy centrally apertured plate 72 of annular form. A plurality of downwardly extending sleeves 74 is mounted in apertures 76 extending through the plate 72 disposed equi-distance apart in an annular pattern as is clearly shown in the drawings. A discharge nozzle 78 is removably secured to each sleeve 74. The filler material container 66 is mounted by means of bearings 80, and other bearings not shown, for rotation counterclockwise about a stationary vertical shaft 82. The filler material discharge mechanism 10 is also mounted on the shaft 82 by means of the integral sleeve 14, a winged washer 84 and a wing nut 86. The winged washer 84 engages in opposed longitudinal slots 88 in the free end of the sleeve 14, the wing nut 86 being threaded upon a threaded reduced extension 90 of the vertical shaft 82 to clamp the wing washer 84 and therethrough the sleeve 14 in a fixed position in relation to the stationary shaft 82.

In association with each opening 76 in the plate 72 and forming a part of the filler discharge mechanism 10 is an arcuate trough segment 92 of the configuration clearly shown in FIGURES 2, 5 and 6. Each trough 92 includes a sloping bottom 94 which extends across an opening 76 and to a point a short distance from the next opening 76. An arcuate end 96 defines the deep part of the trough 92. As illustrated, there is a short segment of plate surface 98 between each trough segment 92 which can be modified or eliminated if desirable. It is manifest that the arcuate end 96 of the trough segment 92 provides smooth movement for the blade 32 in its descent into the trough segment 92, thereby eliminating pounding and resultant vibration. Wear on the parts is reduced to a minimum by the configuration of the trough segment 92 and the angle of the blade 32.

It is manifest from the foregoing that when the filler material container 66 and the enclosed filler material discharge mechanism 10 are mounted operatively in conjunction with cracker-sandwich filling machinery, the filler material discharge mechanism 10 will function to discharge a predetermined amount of filler material through the nozzles 78 as each is reached in turn by the dasher 12 and the following blade 32. The configuration of the trough segments 92 and the configuration and disposition of the blade 32 combine to substantially eliminate leakback of material under the blade 32 once the latter reaches or touches the bottom of the former. This provides consistent accuracy in the predetermined amount of material deposited upon each cracker or wafer. This relationship of elements is particularly helpful when the filler material is not of even consistency or when the level of the filler material varies. Further, with the instantly disclosed discharge mechanism 10, there is substantially no variation in the amount of deposit even when the r.p.m. of the cracker-sandwich filling machine is changed, either by speed-up or slow-down.

It is also apparent from the foregoing description that the position of the blade 32 can be readily changed as desired while the machine on which the discharge mechanism 10 is mounted continues to operate, since the filler material discharge mechanism 10 is stationary and the adjustment knob 62 can be readily reached simply by removing the casing top 70. This, of course, saves downtime, an important factor with all machinery.

It is apparent that there has been provided a filler discharge mechanism which fulfills the objects and advantages sought therefor.

It is to be understood that the foregoing description and the accompanying drawing have been given by way of illustration and example. It is also to be understood that changes in form of the elements, rearrangement of parts, and substitution of equivalent elements, which will be obvious to those skilled in the art, are contemplated as within the scope of the present invention which is limited only by the claims which follow.

What is claimed is:

1. In combination, a filler material discharge mechanism comprising a plurality of filler material receiving troughs, means for rotating said troughs, means for maintaining filler material in relation to said troughs for trapping therein, each trough including a sloping bottom, a discharge opening in each trough at the shallow end thereof, means for trapping filler material in said troughs, and means for discharging a predetermined amount of filler material from each trough in succession.

2. In combination, a filler material discharge mechanism comprising a plurality of filler material receiving troughs, means for rotating said troughs, means for maintaining filler material in relation to said troughs for trapping therein, each trough including a sloping bottom, a discharge opening in each trough at the shallow end thereof, means for trapping filler material in said troughs, means for discharging a predetermined amount of filler material from each trough in succession, and means for adjusting said discharge means to vary the amount of filler material discharged, said adjusting means being adjustable while said mechanism is in operation without shutdown thereof.

3. In combination, a filler material container including a cylindrical casing and a bottom plate, means for rotating said container, said bottom plate including spaced troughs disposed annularly, means for successively trapping filler material in said troughs, each trough having a discharge opening associated therewith, each trough having a bottom sloping upwardly toward its discharge opening, and means for successively moving a predetermined amount of filler material from each trough into its discharge opening.

4. In combination, a filler material container including a cylindrical casing and a bottom plate, means for rotating said container, said bottom plate including spaced troughs disposed angularly, means for successively trapping filler material in said troughs, each trough having a discharge opening associated therewith, each trough having a bottom sloping upwardly towards its discharge opening and means for successively moving a predetermined amount of filler material from each trough into its discharge opening, including a spring-pressed blade and means for adjusting the operative position of said blade, said adjusting means being adjustable during operative use of said blade.

5. In combination, in a sandwich making machine, a filler material holding and discharge mechanism comprising a container including a bottom plate, means for rotating said plate, a plurality of arcuate trough segments in said plate disposed annularly, an opening through each trough segment, a filler material discharge member extending downwardly from each opening, and means for forcing a predetermined amount of filler material from each trough segment into its related discharge member at least once each revolution of said plate, including a stationary plate extending over at least one arcuate trough segment, and a blade mounted in said plate and extending into position below said plate, each trough segment including a bottom sloping from a point of greatest depth upwardly toward its related opening, said blade being disposed selectively to contact the bottom of each trough segment at a predetermined point, said blade being of a width about equal to that of said trough segment so that the blade moves filler material in the trough segment ahead of a discharge member into the discharge member as the plate is rotated.

6. In combination, a filler material container including a cylindrical casing and a bottom plate, means for rotating said container, said bottom plate including spaced troughs disposed annularly, means for successively trapping filler material in said troughs, each trough having a discharge opening associated therewith, each trough having a bottom sloping gradually upwardly towards its discharge opening, each trough being arcuate at its rear end, and means for successively moving a predetermined amount of filler material from each trough into its discharge opening, including a spring-pressed blade and means for adjusting the operative position of said blade, said blade being adapted to successively enter each trough at the rear arcuate end smoothly and without jarring action.

7. The combination of claim 6 in which said blade is adjustable vertically without stopping rotation of said container.

References Cited by the Examiner
UNITED STATES PATENTS

| | | | |
|---|---|---|---|
| 763,525 | 6/1904 | Van Beresteyn | 103—123 X |
| 1,501,297 | 7/1924 | Anderson | 222—216 |
| 2,812,719 | 11/1957 | Nash | 103—123 |
| 2,814,261 | 4/1954 | Meagher et al. | 103—123 |
| 2,941,698 | 6/1960 | Fowler et al. | 222—216 |

RAPHAEL M. LUPO, *Primary Examiner.*

LOUIS J. DEMBO, HADD S. LANE, *Examiners.*